United States Patent Office 3,043,733
Patented July 10, 1962

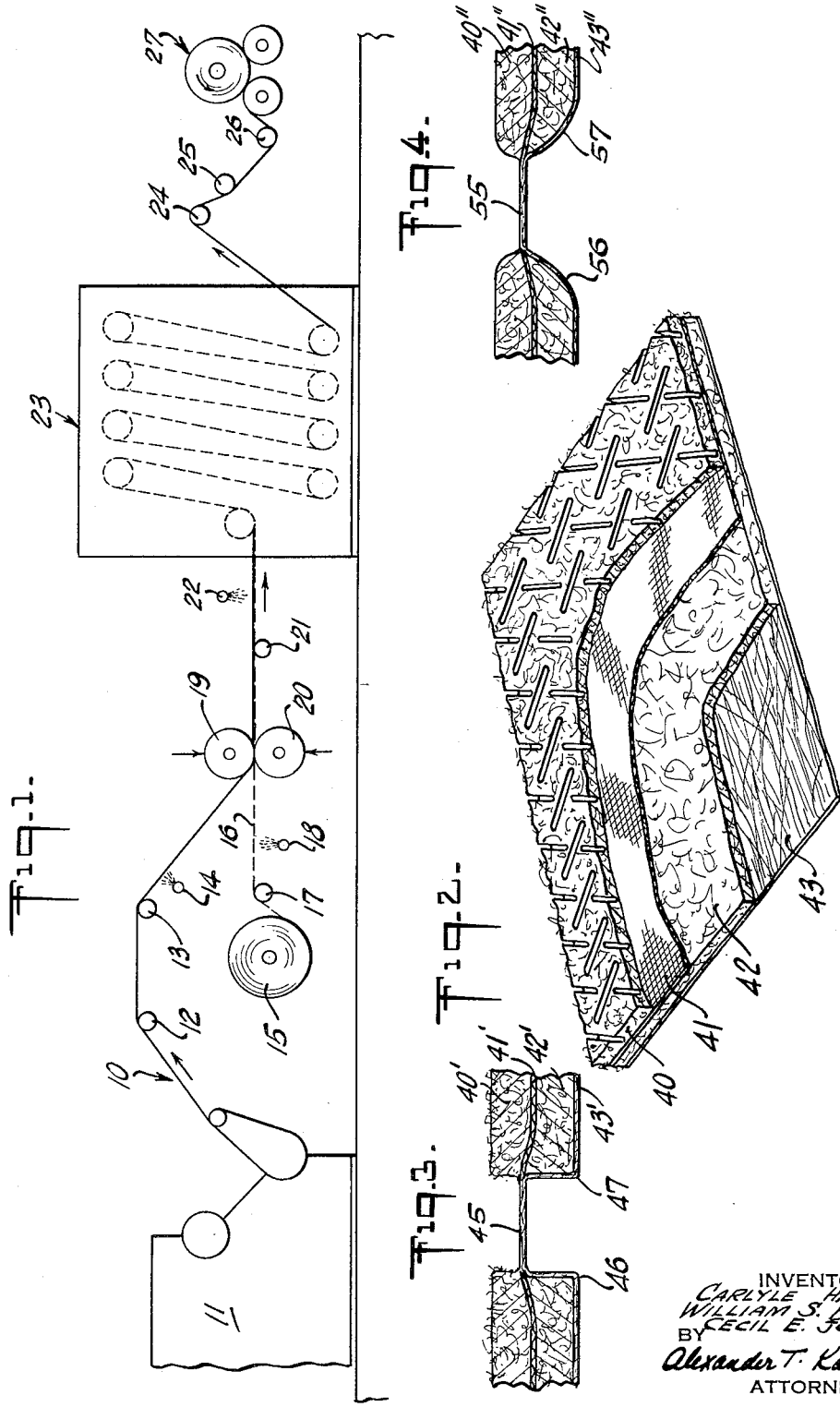

3,043,733
METHOD OF MANUFACTURING AN INSULATING
INTERLINING FABRIC
Carlyle Harmon, Scotch Plains, N.J., and William S.
Barnard, North Wilbraham, and Cecil E. Johnson,
Springfield, Mass., assignors to Chicopee Manufacturing Corporation, a corporation of Massachusetts
Filed Dec. 5, 1957, Ser. No. 700,862
1 Claim. (Cl. 156—209)

The present invention relates in general to composite fibrous products, to processes of manufacturing the same, and to uses of the resulting products, notably as warmth or insulating interlinings, and the like. More specifically, the present invention relates to composite fibrous products of excellent durability, hand, softness, insulating capacity, bulk and loft, which properties are produced and retained therein by improved processes forming a part of the present inventive concept.

Composite fibrous products have been manufactured hitherto from one or more layers of woven and/or knitted textile fabrics to which have been adhered one or more low density, felt-like layers containing loosely assembled fibrous materials. Adherence of all these layers has been affected in many ways, such as by bringing them together in contacting relationship and then by activating potentially adhesive materials in one or several of the layers by the use of heat. The resulting products are relatively thick and soft and are characterized by low density, high porosity and high permeability, which properties render them useful as heat insulators, sound deadeners, upholstery padding, seat cushions, rug and carpet underpads, etc.

Unfortunately, in the process of adhering the felt-like layers to the woven and/or knitted textile fabrics, the bringing of the layers together in contacting relationship, followed by the application of the necessary heat to activate the potentially adhesive materials, has resulted in a flattening or crushing of the product whereby at least a substantial portion of its durability, hand, softness, insulating ability, bulk and loft is lost. The use of heated calenders or other rolls and platens has been exceptionally objectionable in this respect.

In an effort to avoid the objectionable loss of bulk and loft, the heat required to activate the potentially adhesive materials has been applied only in small selected embossing pattern areas to develop the required adhesive properties thereat while leaving the remaining portions between the embossing areas out of direct contact with the heat and pressure. In this way, it was hoped that only the embossed areas would be flattened and crushed whereas the portions of the product between such areas would retain their bulk and loft.

It is to be appreciated that such processing involves two diametrically opposed concepts, namely that of obtaining good coalescence of the fibers and adherence of the layers as opposed to the maintenance of the bulk and loft. That is to say, the greater the heat the greater the coalescence and adherence, but the lesser is the resulting bulk and loft. In the same way, the lesser the heat, the lesser the coalescence and adherence but the greater is the bulk and loft. As a result, prior art processing has been a compromise of involving the use of sufficient heat to obtain acceptable coalescence and adherence whereby the loss of bulk and loft is decreased a minimum amount.

In connection with such prior art processes, plasticizers, such as dibutyl phthalate, for example, have been applied to the fibrous materials, or to the composite product, before activation of its potentially adhesive properties in an effort to lower the thermo-softening point of the adhesive, in order to protect the product from the harmful effects of overheating. Solvents or swelling agents, such as acetone, ethyl acetate, etc., have also been employed in similar uses to render the potentially adhesive materials tacky at lower temperatures to assist in the adhering function.

It has been found that, although the potentially adhesive materials are usually satisfactorily activated in the desired areas to adhere the several layers securely together, the portions between the heated embossed areas also become somewhat affected. This is due most likely to the heat radiated from the heat-applying means, or to the effect of the plasticizers, or the solvents or swelling agents on the activatable materials, or to a combination of these and other factors. As a result, a considerable portion of the resulting product loses its over-all bulk and loft characteristics and does not retain its desirable hand, softness and flexibility.

Additionally, the presence of the plasticizer, solvent or swelling agent, although very helpful in providing for the initial activation of the inherent adhesivity in the desired areas, is undesirable at a later time during pressing and ironing of the product by the user when additional fusing or coalescing are highly undesirable. As a consequence, elaborate precautions involving extensive washing and extracting procedures are often required to remove the plasticizer, solvent or swelling agent, after the initial activation and before its ultimate use.

Many other methods have been devised in the past; but thus far, no one particular method has been universally accepted and there obviously still remains considerable room for improvement in such methods and products.

It is therefore a principal object of the present invention to provide an improved composite fibrous product possessing excellent fiber-coalescence and layer-adherence without any substantial loss of bulk or loft.

It is a further principal object of the present invention to provide improved methods of manufacturing composite fibrous products which possess excellent hand, softness, bulk, and loft, which properties are produced and retained by improved processes for adhering the various layers of the composite fibrous products.

It is a still further principal object of the present invention to provide improved methods of manufacturing composite fibrous products wherein the individual layers are adhered, where required, and substantially unadhered, where desired.

It is another principal object of the present invention to provide improved methods of manufacturing composite fibrous products which will permit the initial activation of the inherent adhesive properties of the materials in the composite fibrous products at a lower temperature. This effect, however, is temporary and fugitive in nature and naturally and spontaneously leaves the products almost immediately after activation, thereby obviating procedures normally required to remove the undesirable plasticizers or other softening materials hitherto used for lowering the melting or softening point of the thermoplastic adhesive materials in the layer.

It has now been found that, if the textile fabric layers and/or the loosely assembled fibrous materials are wetted or moistened with water rather than an organic solvent or plasticizer, the subsequent application of heat and pressure to the composite fibrous product will result in excellent adherence in the predetermined embossing pattern areas only, whereas the portions between such areas remain substantially unadhered and relatively unaffected and retain all their desirable characteristics and properties of excellent hand, softness, bulk and loft.

It is believed that these desirable features and advantages are obtained due to the presence of water and the absence of organic solvents or plasticizers during the actual application of heat and pressure. The precise reasons for obtaining the excellent coalesence and adherence only in the predetermined embossing patterns with substantially no coalescence and adherence in all other portions of the composite fibrous product is not completely understood; but it is known that the presence of all three factors; namely, water, heat and pressure, are required. The absence of any one of these factors will preclude satisfactory adherence of the several layers. Thus, in the portions of the composite fibrous products, which are to retain their bulk and loft, there may be considerable water or moisture. There may even be a substantial amount of heat radiated from the heated areas. Nevertheless, since there is no application of pressure in these other portions of the composite fibrous product, there is substantially no adherence of the layers thereat. As a result, these portions retain their bulk and loft and pillow out in soft, puff-like fashion whereas the embossed patterns are adhered satisfactorily in sharply and clearly defined areas.

Additionally, the applied water, being volatile or vaporizable in nature, does not tend to remain in the resulting product and the adhesive thermo-softening point of the fibrous product is not permanently lowered to create problems in subsequent ironing, pressing and like operations by the ultimate user. This naturally permits further processing of the product immediately after the application of heat and pressure without the requirement of extensive washing or other extracting procedures to remove the undesirable plasticizers having a tendency to remain in the product.

Other features and advantages of the present invention will become apparent from the following description and accompanying drawing of the preferred embodiment of the inventive concept but merely illustrative thereof. With reference to the accompanying drawing:

FIGURE 1 is a schematic showing of one form of textile apparatus suitable for preparing the composite fibrous products of the present invention;

FIGURE 2 is a perspective view of a composite fibrous product which is manufactured on the apparatus set forth in FIGURE 1;

FIGURE 3 is a cross-sectional view of the fabric of FIGURE 2, taken through an embossed area, showing the results of embossing by means of process of the present invention; and FIGURE 4 is a cross-sectional view of the fabric of FIGURE 2, taken through an embossed area, showing the results of embossing by means of prior art processing.

In the embodiment of the invention set forth in FIGURE 1 of the drawing, an upper web 10 is shown being delivered from a web-forming device 11, such as a "Curlator." In the particular embodiment shown, as in FIGURE 2, the upper web 10 comprises a loosely assembled fibrous layer 40 laid down continuously and substantially uniformly on a textile fabric 41. The upper web 10 passes over guide rollers 12 and 13 which may be driven continuously. A spray device 14 is disposed beneath the traveling web 10 to supply water or moisture to the underside thereof. In the particular embodiment shown, the textile layer 41 which is on the underside of web 10 at that time is wetted whereas the fibrous layer 40 which is on the upper side of web 10 at that time remains comparatively dry.

A supply roll 15 delivers a second lower web 16 over guide roller 17 and the underside thereof may be wetted or moistened by a water spray device 18 which is situated under the traveling web 16. In the particular embodiment shown, the traveling lower web 16 comprises a loosely assembled, fibrous layer 42 laid down substantially uniformly on a facing layer which may, for example, comprise a nonwoven fabric 43, such as "Masslinn" nonwoven fabric or "Keybak" bundled fabric. The spray coming from spray device 18 moistens the nonwoven fabric 43 whereas the loosely assembled fibrous layer 42 remains comparatively dry.

The upper and lower webs 10 and 16 are brought together between the nip of a pair of embossing calender rolls 19 and 20 which are internally heated and which apply the required heat and pressure to emboss and adhere webs 10 and 16 in the desired pattern areas. The embossed composite product 44 comprising layers 40, 41, 42 and 43 is then directed over guide roller 21. A spray device 22 may be used to apply a resin coating to the upper surface thereof to lay the surface fibers. The embossed product is then passed through a drying oven 23 which is maintained at a temperature in the range of from about 220 to about 300° F. This is sufficient to drive off any remaining moisture in the product. The dried product is then passed over guide rollers 24, 25, and 26 and is wound on a batch-delivery roll 27.

In the event that composite fibrous products are desired having a different layer construction than that set forth in the preceding paragraphs, such is accomplished by a simple modification of the apparatus set forth in FIGURE 1.

For example, a composite fibrous product comprising two loosely assembled fibrous layers, between which is sandwiched a textile fabric, is prepared by such apparatus by merely (1) using the "Curlator" to supply an upper web containing a loosely assembled fibrous layer on a textile fabric and (2) employing a supply roll which supplies a single, loosely-assembled, fibrous layer without any nonwoven fabric facing for the lower web. In such a case, the water spray 18 is rendered inoperative so that the fibrous layer being delivered from the supply roll is not wetted or moistened. The water spray device 14 continues to operate in the same fashion, as previously described, to wet the textile fabric upon which the upper loosely-assembled fibrous layer is carried. It is, therefore, seen that only the textile fabric is wetted in this instance and that the two loosely-assembled fibrous layers remain comparatively dry. In this way, the embossing calender rolls carry out their desired functions of merely adhering the layers together in the small embossing pattern areas, while leaving all other portions of the composite fibrous product relatively unadhered and substantially unaffected.

Other omposite fibrous products containing various other combinations of fibrous layers, textile fabrics and nonwoven fabrics may be produced, as desired.

The nature of the embossed pattern in the composite fibrous product of the present invention is clearly shown in FIGURE 3, the product to be described later as Example 1. The layers 40', 41', 42' and 43' correspond to layers 40, 41, 42 and 43 of the product illustrated in FIGURE 2, after the embossing process. The thin embossed area 45 is created by the ridge of the embossing tooth which is rectangular in cross-section. The bottom of the ridge, that is, the area in which the embossing pressure is directly applied is more or less hardened, firm and in the coalesced, adhered condition. The fibrous structure is completely gone and the resulting film is translucent. The sides of the embossed pattern areas, however, are still loose and fibrous, as shown. The corners 46, 47 are clearly and sharply defined and the outer surfaces of the product are also loose and fibrous, as shown.

It is therefore established that the sides, corners and adjacent outer surfaces of the composite fibrous product, even though wetted with water and heated by radiant heat from the heated embossing tooth, remain loose and fibrous whenever no pressure is directly applied.

This is to be contrasted with the product shown in FIGURE 4. In the process used in making this product, a plasticizer (dibutyl phthalate) rather than water was sprayed on the surfaces of the product. The bottom 55 of the ridge directly contracted with the heated embossing tooth is hardened and firm. However, the sides and adjacent outer surfaces of the product, being heated by the heat radiated from the embossing tooth, have coalesced and have hardened to some degree. The corners 56, 57 are not sharp, loose or fibrous but are rounded and more or less glazed or smooth. It is presumed that the radiant heat and the presence of the organic plasticizer (dibutyl phthalate) are responsible for this undesirable effect and loss of bulk and loft.

The number and weight of the various felt-like fibrous layers, textile fabrics and nonwoven fabrics may be varied within relatively wide ranges depending quite naturally upon the properties and characteristics of the materials used in their manufacture and the intended purpose and use of the resulting composite fibrous product.

For example, there may be up to as many as three or four felt-like fibrous layers, the total layer weight of all layers being in the range of from about 600 to about 2000 grains per square yard and preferably from about 900 to about 1600 grains per square yard. Similarly, there may be up to as many as three or four textile fabrics, the layer weight varying within very wide limits and depending upon the particular type of textile fabric employed. In the case of the nonwoven fabric which is intended primarily as a facing layer, either one or two of such layers may be used, unless it is desired to omit such a facing layer entirely. The layer weight of each nonwoven fabric falls within the range of from 100 to about 300 grains per square yard and preferably from about 150 to about 250 grains per square yard.

The term "textile fabric" as used herein includes fabricated products containing interengaged threads and made by any textile manufacturing method of associating such threads, such as weaving, knitting, netting, lacing, crocheting, braiding, felting, bonding, and the like. Although the present invention will be described primarily with reference to a woven gauze fabric as the reinforcing fabric, such is intended to be illustrative and is not to be construed as limitative of other textile fabrics which are applicable within the scope of the present inventive concept. Typical of such other textile fabrics are scrim, burlap, monk's cloth, buckram, grass cloth, crash, cheesecloth, bunting, crinoline, lace, tricot, jersey, netting, etc.

With reference to the term "loosely assembled fibrous layers," such is intended to apply to materials which are produced directly from fibers without the use of conventional textile fabricating processes such as weaving, knitting, netting, lacing, crocheting, braiding, and the like. These layers are thick and soft and are characterized by extremely low density and high porosity and permeability. The fibers therein are more or less arranged in an overlapping, intersecting, loosely assembled mass which is open and porous. The fibers in these materials may be deposited by air deposition techniques in which they are disposed at random to lie in completely haphazard fashion or they may be carded or garnetted to any desired degree in which they will lie in more or less parallel alignment with less overlapping and intersecting of the fibers.

The potentially adhesive materials which are included either in the textile fabric or in the loosely assembled fibrous layers are thermoplastic and relatively water-insensitive and are preferably in the form of textile fibers. These fibers are preferably of standard textile length in the range of from about ½ inch to about 3 inches, although a minor portion of shorter or longer fibers may be included where special requirements or particular effects are involved. The denier of such synthetic thermoplastic fibers is in the range of from about 1 to about 12 and preferably from about 1.5 to about 5.5. Substantially any synthetic thermoplastic fiber which is not water-sensitive may be used.

The present invention will be described in particularity with reference to the use of cellulose acetate but it is to be appreciated that other thermoplastic fibers could be used, such as nylon (diamine-dicarboxylic acid-type, such as nylon-6/6 and nylon-6/10, or polycaprolactam-type, such as nylon-6); other cellulose esters such as cellulose triacetate; polyester fibers, such as "Dacron"; vinyl resin fibers, such as "Vinyon" and "Saran," acrylic fibers, such as "Dynel," "Orlon," "Acrilan," "Creslan," etc.; polyethylene fibers; etc.

These synthetic thermoplastic fibers may be used by themselves, or in blends with each other in any desired proportions, provided the resulting temperatures of adhesive activation is not that high as to damage other materials in the composite fibrous product. Additionally, blends with non-thermoplastic fibers may be used, provided such non-thermoplastic fibers are also not water-sensitive. Such other non-thermoplastic fibers may be included in amounts ranging from about 1% or 2% by weight up to about 50% by weight. Wool glass fibers, silk, etc., are examples of such other fibers which are suitable for blending inasmuch as they are sufficiently water-insensitive.

The temperatures to which the embossing calender rolls are heated will depend upon many factors, the most important of which being the nature of the thermoplastic fibers used in the composite fibrous product, the speed at which the composite product passes through the rolls and the pressure applied by the rolls. As mentioned previously, cellulose acetate is the preferred fiber for use in the present invention. Under normal circumstances, cellulose acetate fibers become tacky or sticky in the range of from about 397° F. to about 406° F., and will ultimately melt about 500° F. Within the commercial aspects of the present invention, it has been found that a temperature range of from about 365° F. up to about 450° F. is desired for satisfactory activation of the thermoplastic adhesive properties of these fibers. Within the range, good bonding is obtained without destroying the soft hand, bulk and loft of the resulting product. Within the preferred aspects of the present invention, it has been found that a temperature range of from about 380° F. to about 435° F. yields products of excellent bond and very soft hand.

It is not essential that both calender rolls be embossing rolls. If desired, one may be an embossing roll with the pattern areas thereon and the other roll may be a plain unembossed roll in the fashion of a backing roll.

It is also not essential that both rolls be heated to the temperatures indicated above. It is sufficient, for example, that the particular roll carrying out the embossing function be heated to a temperature of from about 410° F. to about 525° F. and preferably from about 415° F. to about 485° F. The other roll, more properly called a backing roll in such a case may be heated to a substantially lower temperature in the range of from about 100° F. to about 150° F. In many cases where the temperature of one roll is satisfactorily maintained, the other roll need not be heated at all.

The amount of pressure required to accompany the application of heat will also vary within wide ranges depending upon the particular nature and characteristics of the thermoplastic fiber used and the temperature to which the rolls are heated. In general, however, it has been found that pressures ranging from about 30 to about 100 pounds of linear inch of embossing roll are satisfactory, providing the above temperature ranges are followed. Within the more commercial aspects, however, pressures of from about 40 to about 80 pounds per linear inch of roll are preferred.

With reference to the actual embossing pressures exerted by the embossing roll patterns in direct contact with the composite fibrous product on the backing roll, the contacting length of pattern areas is normally about one-eighth of the total length of the embossing roll and consequently the actual embossing pressures exerted on the embossed areas is approximately eight times the linear length pressures calculated on the linear inch length of the embossing roll. Reduced to its simplest terms, the actual embossing pressure exerted on the embossed area ranges from about 240 to about 800 pounds per linear inch, based on embossing length rather than total roll length, and preferably from about 280 to about 560 pounds per linear inch of embossing length along the roll.

Under such conditions of temperature and pressure, a fabric feed of from about 8 yards per minute to about 30 yards per minute has been found satisfactory for the required coalescence and adherence.

The particular pattern area which is selected to bond the layers together may be selected from a wide range of designs. For example, designs such as illustrated in U.S. Patent 2,705,687, issued April 5, 1955, to Petterson et al., and in U.S. Patent 2,705,686, issued April 5, 1955, to Ness et al. have been found satisfactory. Other similar designs including straight or curved lines, continuous or interrupted, or other geometric figures and the like may be used. The pattern area should be sufficient in number and size so that they are capable of satisfactorily bonding and adhering the felt-like loosely assembled fibrous layers and the textile fabrics.

As used herein, the term "wetting or moistening with water," or similar terms, is not to be construed as limited to the application of water solely in the liquid phase. Such a term is intended to include the application of water, for example, in the form of moisture or the vapor phase. The term "wetted" is not to be restricted to mean apparent or sensible wetness, but is intended to cover the addition of water or moisture in an amount sufficient to bring about the desired effect of lowering the softening point in the required areas and permitting the adhesion of the layers in the composite fibrous product. In the usual case, this has been found to range from 2% to about 25% by weight of added water, based on the weight of the composite fibrous product being treated. The lower amounts are, of course, satisfactory with light weight products whereas the higher amounts are required for heavier fabrics. In its broader aspects, it is intended to cover the supplying of moisture to the fabric in an amount sufficient to bring the total moisture present in the fabric well in excess of the normal moisture equilibrium content (regain) under the same temperature and pressure condition.

It is to be appreciated that small amounts of wetting or surface active agents, or materials providing for more rapid evaporation or volatilization of the water, or other improvement agents, may be added to the water, provided the effect of such additions is limited to their directly-intended purpose and that they do not have objectionable side-effects, nor undesirably remain in the composite fibrous product after bonding.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

*Example I*

A composite fibrous product is prepared by the procedures set forth herein describing FIGURE 1. The composite fibrous product comprises (1) an upper layer of loosely assembled fibrous materials, (2) a woven gauze layer, (3) a second layer of loosely assembled fibrous materials, and (4) a facing layer of nonwoven fabric. The upper fibrous layer is produced by a "Curlator" and has a layer weight of about 600 grains per square yard. It is made completely from cellulose acetate (an equal mixture of 2 denier, 2 inch staple fiber and garnetted 3.75 denier thread waste). The second layer comprises a 24 x 20 woven, bleached, cotton gauze fabric. The third layer is also produced by a "Curlator" and has a layer weight of about 600 grains per square yard. It is also made completely from cellulose acetate fibers, as above. The facing layer is a square pattern, nonwoven fabric as described in U.S. patent applications Serial Nos. 503,871 and 503,872, filed April 26, 1955. This nonwoven fabric is made of viscose rayon and has a layer weight of about 200 grains per square yard.

Both the gauze and the nonwoven fabric are wetted with water by water spray devices. The embossing pattern used is similar to that set forth in Figure 3 of U.S. Patent 2,705,687. An embossing roll temperature of about 415° F. and a backing roll temperature of about 110° F. are used under a pressure of about 70 pounds per linear inch of roll-product contacting line to bond the layers. Drying is effected at about 220° F. The product obtained is suitable as an attractive, functional, insulating interlining for winter coats due to its excellent hand, softness, durability, bulk and loft.

*Example II*

The procedures of Example I are carried out substantially as set forth therein, except that embossing roll temperatures of about 450° F. are used. Good bonding fusion is obtained with an acceptably soft hand, bulk and loft.

*Examples III and IV*

The procedures of Example I are carried out substantially as set forth therein, except the pressures used are 40 pounds per linear inch and 80 pounds per linear inch of embossing roll. The embossing pattern covers approximately one-eighth of the length of the embossing roll. Good bonding fusion is obtained in both cases with an acceptably soft hand, bulk and loft.

*Example V*

A composite fibrous product is prepared by the procedures substantially as set forth in Example I with the exception that the loosely assembled fibrous layers are made from a blend of 50% by weight of cellulose acetate (2 denier, 2 inch staple) and 50% by weight of viscose rayon (1.5 denier, 2 inch staple). The product obtained is suitable as an attractive, durable, functional insulating interlining for winter coats.

*Example VI*

A composite fibrous product is prepared by the procedures substantially as set forth in Example I, with the exception that the facing layer of nonwoven fabric is omitted. Only the second (middle) layer, the 24 x 20 woven bleached gauze fabric, is wetted. The product obtained is soft, possesses good hand and has sufficient bulk and loft to be suitable as a functional insulating interlining for winter coats.

*Example VII*

The procedures set forth in Examples I and VI are carried out substantially as set forth therein to produce a similar three-layer composite fibrous product with the exception that the middle layer of gauze fabric is made of cellulose acetate whereas the loosely assembled felt-like materials comprising the outer layers are 200 grains per sq. yard and contain 1.5 denier, 2 inch staple viscose rayon. Bonding fusion is obtained with an acceptably soft hand, bulk and loft whereby the product is suitable as a warmth interlining for winter coats.

*Example VIII*

A two-layer composite fibrous product is prepared by procedures generally set forth in Example I. The composite fibrous product comprises an upper loosely assembled material having a weight of 1200 grains per square yard and made completely from cellulose acetate (2 denier, 2 inch staple). The lower layer comprises a 24 x 20 woven bleached gauze fabric and is the layer wetted by the water spray. The embossing pattern used is similar to that set forth in Figure 4 of U.S. Patent 2,705,687. The product obtained is soft and bulky and is suitable as a functional warmth insulating interlining for winter coats.

*Example IX*

The procedures of Examples I and VIII are carried out substantially as set forth therein to produce a similar two-layer composite fibrous product with the exception that the loosely assembled fibrous materials comprise a 50–50% by weight blend of cellulose acetate and 1.5 denier, 2 inch staple polyamide nylon 6/6, and weigh 1400 grains per square yard. The resulting interlining is strong and heat-transfer resistant. The product is suitable as a heat insulator.

Example X

The procedures set forth in Example I are carried out substantially as set forth therein with the exception that the loosely assembled fibrous materials comprise 2.5 denier, 2 inch staple "Arnel" (cellulose triacetate fibers). The resulting interlining is well bonded, strong and soft and suitable as a heat insulator.

Example XI

The procedures set forth in Example I are carried out substantially as set forth therein with the exception that the loosely assembled fibrous materials comprise 1.5 denier, 1½ inch staple "Dacron" (polyester fibers). The resulting interlining is well bonded, strong and soft and suitable as a heat insulator.

Example XII

The procedures set forth in Example I are carried out substantially as set forth therein with the exception that the surfaces of the loosely assembled fibrous materials contacting the gauze and nonwoven fabric are wetted with the water spray. The gauze and nonwoven fabric are not wetted with water and remain comparatively dry substantially to the time the layers are adhered under heat and pressure. The product obtained is suitable as a durable, heat insulating interlining.

Example XIII

The procedures set forth in Example I are carried out substantially as set forth therein with the exception that all of the layers are wetted with water from appropriately positioned water spray devices. The layers are successfully adhered to each other and the composite product remains bulky and soft with many pillow-like puffs affording excellent hand and softness.

Example XIV

The procedures set forth in Example I are carried out substantially as set forth therein with the exception that both the embossing roll and the backing roll are heated to a temperature of about 370° F. The product obtained is suitable as an attractive, warmth interlining for use in winter coats.

Example XV

The procedures set forth in Example I are carried out as set forth therein with the composite fibrous product construction being as follows: a top layer of loosely assembled 1200 grains per square yard of 50% cellulose acetate and 50% viscose; a second layer of 24 x 20 bleached cotton gauze; a 200 grain per square yard nonwoven fabric containing 50% cellulose acetate and 50% viscose; and a bottom layer of loosely assembled 60 grains per square yard of 50% cellulose acetate and 50% viscose. The result product is a heavy interlining suitable for Arctic-wear coats.

Example XVI

The procedures set forth in Example I are carried out as set forth therein with the composite fibrous product construction being as follows: a top layer of 1200 grains per square yard of loosely assembled 50% cellulose acetate and 50% viscose, a middle layer of 200 grains per square yard nonwoven fabric containing 50% cellulose acetate and 50% viscose; and a lower layer of 24 x 20 bleached cotton gauze. The product obtained is suitable as a durable, warmth interlining for coats.

Although several specific examples of the inventive concept have been described, the same should not be construed as limited thereby nor to the specific substances mentioned therein but to include various other compounds of equivalent constitution as set forth in the claim appended hereto. It is understood that any suitable changes, modifications, and variations may be made without departing from the spirit and scope of the invention.

We claim:

In a method of manufacturing a composite fibrous product comprising at least one layer of a textile fabric containing interengaged threads and at least one layer of a fibrous material containing overlapping, intersecting, loosely assembled fibers, said layers being adhered by the inherent adhesive properties of thermoplastic fibrous materials present in at least one of said layers, the improvement which comprises uniformly wetting with water an entire surface of at least one layer of a plurality of superimposed contacting layers, in a layer assembly of said textile fabric, and said fibrous material to raise the total moisture present in said layer to about 2% to about 25% in excess of the normal moisture equilibrium content (regain) of said layer, and while wetted, applying heat and pressure to the layer assembly, in a predetermined embossing pattern of spaced areas whereby said layers are adhered in said areas but remain substantially unadhered and relatively unaffected in substantially all other portions of said layers, the adhered pattern areas thus formed in the fibrous product having a firm and coalesced bottom surface and being defined by embossed unadhered areas presenting loose and fibrous side surfaces adjacent the adhered pattern areas and loose and fibrous outer surfaces adjacent said side surfaces, the separation between the adhered and unadhered portions thus being sharply and clearly defined whereby excellent hand, softness and loft are created in said composite fibrous product.

References Cited in the file of this patent

UNITED STATES PATENTS

| | | |
|---|---|---|
| 2,464,301 | Francis | Mar. 15, 1949 |
| 2,497,117 | Dreyfus | Feb. 14, 1950 |
| 2,521,985 | Lang et al. | Sept. 12, 1950 |
| 2,543,101 | Francis | Feb. 27, 1951 |
| 2,834,703 | Atkinson | May 13, 1958 |